April 18, 1961 C. E. HOTHEM 2,980,888
VEHICLE WARNING SYSTEM
Filed Oct. 8, 1958
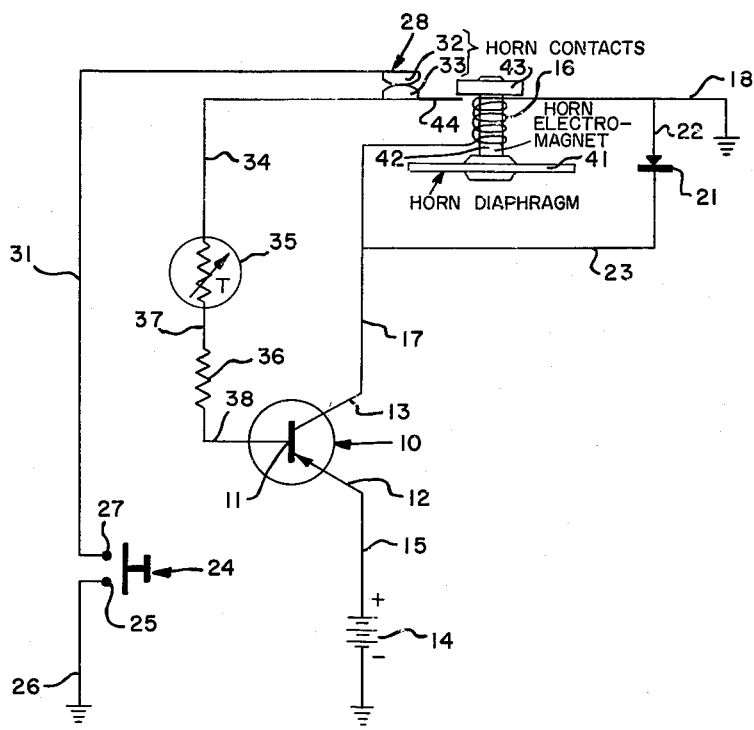
C. E. HOTHEM
*INVENTOR.*
BY E. C. McRae
E. H. Oster
K. L. Zerschling
ATTORNEYS

2,980,888

VEHICLE WARNING SYSTEM

Clarence E. Hothem, Dearborn, Mich., assignor to Ford Motor Company, Dearborn, Mich., a corporation of Delaware Filed Oct. 8, 1958, Ser. No. 766,118

7 Claims. (Cl. 340—62)

This invention relates to a vehicle warning system and more particularly to a vehicle warning system in which the intensity of the sound emitted therefrom is a function of the time said system is energized.

In present day driving conditions it is desirable to provide a motor vehicle with a warning system which is capable of producing a low intensity sound for city driving and other locations where loud noises are objectionable or prohibited and which is capable of producing a high intensity sound for country or high speed driving. This is accomplished according to the construction of the present invention by providing a warning system which is energized by the output of a transistor and which produces a sound having an intensity level proportional to the energy flowing in the transistor output. Means are provided in the input circuit of the transistor for varying the impedance of the input circuit as an inverse function of the time said input circuit is energized. This means can take the form of a non-linear circuit element, and preferably takes the form of a negative temperature coefficient resistance member which is heated by the passage of current in the input circuit, thereby lowering its resistance with the passage of time. This means is preferably of the type in which the resistance reaches a certain minimum value after a predetermined length of time of continuous operation. Thus when the input circuit of the transistor is first energized a low intensity sound will be emitted from the vehicle warning system and with the passage of time the intensity of the sound will increase until after a predetermined length of time, for example three seconds, the intensity of sound emitted will have reached a maximum value. During city driving conditions the operator may produce short blasts of low intensity sound and when a high intensity sound is needed for high speed driving conditions the operator need only actuate the input circuit for the predetermined time mentioned above.

An object of the present invention is a vehicle warning system which provides a low intensity sound for city driving conditions and a high intensity sound for country driving conditions.

Another object of this invention is the provision of a vehicle warning system the sound level of which varies as a function of the time said system is energized.

A further object of the invention is the provision of a vehicle warning system, the sound intensity of which varies as a function of time and reaches a maximum level after a predetermined time interval.

Other objects and advantages will become more apparent as the specification is considered in connection with the drawing.

The figure in the drawing is a schematic circuit diagram of the present invention.

Referring now to the drawing, there is shown a transistor 10 which includes a base 11, an emitter electrode 12 and a collector electrode 13. A battery 14 is provided as a source of electrical energy for energizing the transistor and the rest of the system. In the construction shown, the negative pole of the battery is grounded and the positive pole is connected to the emitter through a conductor 15. The output circuit of the transistor includes a motor coil 16 of a sound warning system which is connected to the collector 13 by means of a conductor 17. The motor coil is grounded through a conductor 18. A rectifier 21, preferably a selenium plate, is connected in parallel with the motor coil by means of conductors 22 and 23.

The input circuit of the transistor includes a horn button 24 having a first terminal 25 which is grounded through a conductor 26 and a second terminal 27 which is connected to one terminal of a circuit interrupting means 28 through a conductor 31. This circuit interrupting means preferably takes the form of a pair of normally closed contacts 32 and 33. The other terminal of the circuit interrupting means 28 is connected through a conductor 34 to a means for varying the impedance of the input circuit as an inverse function of the time said input circuit is energized. This means can take the form of a non-linear circuit element such as a negative temperature coefficient resistor 35. Although the negative temperature coefficient resistor is shown as a means for varying the impedance of the input circuit as an inverse function of time, it will be readily apparent to those skilled in the art that other non-linear circuit elements may be employed. The negative temperature coefficient resistor is connected to a base resistor 36 through a conductor 37. The base resistor 36 is in turn connected to the base 11 of the transistor through a conductor 38.

The sound generating member of the vehicle warning system of this invention may take many forms but it is preferred to provide a horn diaphragm 41 which is connected to a motor coil armature 42. This armature extends through the motor coil 16 and has an adjustable nut 43 positioned on the other end thereof. The warning system so described is adapted to operate the circuit interrupting means 28 when said system is energized. This may conveniently be accomplished by providing an extension 44 on contact 33 of said circuit interrupting means which is engaged by the adjustable nut 43 when the motor coil 16 is energized.

When the horn button 24 is in the position shown in the drawing, the input circuit of the transistor is unenergized and thus no appreciable current will flow from the battery 14 through the transistor 10 to the motor coil 16. When the horn button 24 is pushed into contact with the terminals 25 and 27 current will flow from the positive terminal of the battery 14 through conductor 15, emitter 12, base 11, conductor 38, base resistor 36, conductor 37 and then through the negative temperature coefficient resistor 35 to the circuit interrupting means 28. From the circuit interrupting means 28 current flows to the horn button 24 through conductor 31 and thence to ground through the conductor 26. Energization of the input circuit will switch on the transistor and will permit current to flow from the positive pole of the battery through conductor 15 and then through the transistor 10 by way of emitter 12 and collector 13. From collector 13 the current will flow through conductor 17 to the motor coil 16 and thence to ground through the conductor 18. When the motor coil 16 is energized it actuates the motor coil armature 42 by moving it in a downward direction, as shown in the drawings, thereby energizing the horn diaphragm 41 to produce the sound desired.

The amplitude of the movement of the motor coil 16, armature 42 and the horn diaphragm 41 and hence the intensity of the sound produced is proportional to the current flowing in the motor coil 16. This is the current flowing in the output circuit of the transistor which in turn is a function of the current flowing in the input circuit and an inverse function of the resistance of the input circuit.

As the motor coil armature moves downwardly the adjustable nut 43 strikes the extension 44 and moves the contacts 32 and 33 to the open position. This action interrupts current in the input circuit thus turning the transistor off and de-energizing the output circuit including the motor coil 16. The motor coil, armature, horn diaphragm and adjustable nut then return to the position shown in the drawings and the contacts 32 and 33 close. The above described action then continues to repeat as long as the horn button 24 is depressed to make contact with the terminals 25 and 27.

The rectifier 21 reduces the inductive surge voltage that occurs when the magnetic field of the motor coil 16 collapses upon de-energization. The structure of the sound producing mechanism including the motor coil 16, coil armature 42, horn diaphragm 41, adjustable nut 43 and the contacts 32 and 33 is well known in the prior art and a further detailed showing is considered unnecessary since it is considered that any person skilled in the art would readily be able to construct the invention from the teachings of the description and drawing.

It can be readily appreciated that when the horn button 24 is held down for only short intervals of time, the resistance of the negative temperature coefficient resistor 35 will remain high and the output current through the motor coil 16 will be low, thereby producing a low intensity of sound. However, when the horn button is held down for an appreciable length of time the resistance of the negative temperature coefficient resistor 35 is lowered and the current flowing in the output circuit of the transistor and hence the motor coil 16 will be large, thus giving rise to a high intensity sound. The negative temperature coefficient resistor 35 will reach a minimum resistance after a predetermined length of time, for example 3 seconds, so that the intensity of sound coming from the horn diaphragm will increase in intensity for this time interval and will then be constant.

Thus the present invention provides a variable intensity horn in which the intensity of the level of the sound produced varies as a function of the time the horn is energized.

The following illustration of the components which may be used to construct a workable device is given by way of example only.

The transistor 10 may be a Delco 2N174.
The battery 14 may supply 12 to 15 volts.
The resistor 36 may have a resistance of 10 ohms.
The negative temperature coefficient 35 may be a Globar thermistor 416H having a resistance of 40 ohms when cold.
The motor coil 16 may have a resistance of .4 ohm and an inductance of 450 micro-henries.
The rectifier 21 may be a selenium plate 1¼ inches by 1¼ inches.

With these components the minimum value of the negative temperature coefficient resistor 35 and hence the maximum value of the intensity of sound emitted will be reached after the horn button has been held down for a period of three seconds. When the resistor 35 reaches the minimum value, the sound intensity is approximately 16 times the sound intensity when the horn button is first depressed. The current in the input circuit which includes the contacts 32 and 33 is small, on the order of ½ ampere at the maximum, with the current in the output circuit reaching a maximum of approximately 10 amperes. Thus it can readily be appreciated that in addition to providing the variable sound intensity required for various driving conditions, the present invention provides increased interrupter contact life as the current in the circuit being interrupted is quite small.

It will be understood that the invention is not to be limited to the exact construction shown and described, but that various changes and modifications may be made without departing from the spirit and scope of the invention, as defined in the appended claims.

What is claimed is:

1. A motor vehicle warning system comprising, a vibrating sound generating member, an electrical means driving said sound generating member, a transistor having an input circuit and an output circuit, said electrical means being positioned in the output circuit of said transistor to be energized thereby, means positioned in the input circuit of said transistor and operable by said electrical means for interrupting said input circuit, and means positioned in the input circuit for varying the impedance of the input circuit as an inverse function of the time said input circuit is energized.

2. A motor vehicle warning system comprising, a vibrating sound generating member, an electrical means driving said sound generating member, a transistor having an input circuit and an output circuit, said electrical means being positioned in the output circuit of said transistor to be energized thereby, means positioned in the input circuit of said transistor and operable by said electrical means for interrupting said input circuit and a non-linear circuit element positioned in the input circuit of said transistor, the impedance of said non-linear circuit element varying as an inverse function of the time said input circuit is energized.

3. A motor vehicle warning system comprising, a vibrating sound generating member, an electrical means driving said sound generating member, a transistor having an input circuit and an output circuit, said electrical means being positioned in the output circuit of said transistor to be energized thereby, means positioned in the input circuit of said transistor and operable by said electrical means for interrupting said input circuit, and a negative temperature coefficient resistance member positioned in the input circuit of said transistor for varying the resistance of the input circuit of said transistor as an inverse function of the time said input circuit is energized.

4. A motor vehicle warning system comprising, a vibrating sound generating member, an electrical means driving said vibrating sound generating member, a source of electrical energy, a transistor comprising a base, an emitter electrode and a collector electrode, the source of electrical energy being connected to one of said electrodes and the electrical means connected to the other of said electrodes, the flow of current through said transistor being controlled by an input circuit connected to the base, means positioned in the input circuit of said transistor and operable by said electrical means for interrupting said input circuit, and means positioned in the input circuit for varying the impedance of the input circuit as an inverse function of the time said input circuit is energized.

5. A motor vehicle warning system comprising, a vibrating sound generating member, an electrical means driving said vibrating sound generating member, a source of electrical energy, a transistor comprising a base, an emitter electrode and a collector electrode, the source of electrical energy being connected to one of said electrodes and the electrical means connected to the other of said electrodes, the flow of current through said transistor being controlled by an input circuit connected to the base, means positioned in the input circuit of said transistor and operable by said electrical means for interrupting said input circuit, and a non-linear circuit element positioned in the input circuit of said transistor, the impedance of said non-linear circuit element varying as an inverse function of the time said input circuit is energized.

6. A motor vehicle warning system comprising, a vibrating sound generating member, an electrical means driving said vibrating sound generating member, a source of electrical energy, a transistor comprising a base, an emitter electrode and a collector electrode, the source of electrical energy being connected to one of said electrodes and the electrical means connected to the other of said electrodes, the flow of current through said transistor being controlled by an input circuit connected to the base, switch means positioned in said input circuit for energizing said transistor, means positioned in the input circuit of said transistor and operable by said electrical means for interrupting said input circuit, and a negative temperature coefficient resistance member positioned in the input circuit of said transistor for varying the resistance of the input circuit as an inverse function of the time said input circuit is energized.

7. A motor vehicle warning system comprising, a vibrating sound generating member, an electrical means driving said vibrating sound generating member, a source of electrical energy, a transistor comprising a base, an emitter electrode and a collector electrode, the source of electrical energy being connected to one of said electrodes and the electrical means connected to the other of said electrodes, the flow of current through said transistor being controlled by an input circuit connected to the base, a pair of contacts positioned in the input circuit of said transistor, means connected to said vibrating sound generating member and operable by said electrical means for opening and closing said contacts in synchronism with the vibrations of said vibrating sound generating member, and a negative temperature coefficient resistance member positioned in the input circuit of said transistor for varying the resistance of the input circuit as an inverse function of the time said input circuit is energized.

References Cited in the file of this patent

UNITED STATES PATENTS

| | | |
|---|---|---|
| 2,354,699 | Owens | Aug. 1, 1944 |
| 2,826,691 | Elliot | Mar. 11, 1958 |
| 2,846,580 | Light | Aug. 5, 1958 |
| 2,856,751 | Preiser | Oct. 21, 1958 |
| 2,910,688 | Kelly | Oct. 27, 1959 |

FOREIGN PATENTS

| | | |
|---|---|---|
| 498,615 | Belgium | Feb. 1, 1951 |